(12) United States Patent
Shankar et al.

(10) Patent No.: US 9,124,628 B2
(45) Date of Patent: Sep. 1, 2015

(54) SEAMLESS ENGAGEMENT AND DISENGAGEMENT OF TRANSPORT LAYER SECURITY PROXY SERVICES

(71) Applicant: Cisco Technology, Inc., San Jose, CA (US)

(72) Inventors: Hari Shankar, San Jose, CA (US); Jianxin Wang, San Jose, CA (US); Daryl Odnert, Los Altos, CA (US); Manju Radhakrishnan, San Jose, CA (US); Andrew E. Ossipov, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 240 days.

(21) Appl. No.: 13/623,127

(22) Filed: Sep. 20, 2012

(65) Prior Publication Data

US 2014/0082204 A1 Mar. 20, 2014

(51) Int. Cl.
*G06F 15/16* (2006.01)
*H04L 29/06* (2006.01)

(52) U.S. Cl.
CPC .................. *H04L 63/166* (2013.01)

(58) Field of Classification Search
USPC ....................................... 709/227
See application file for complete search history.

(56) References Cited

U.S. PATENT DOCUMENTS

| 8,190,879 | B2 | 5/2012 | Wang |
| 8,214,635 | B2 | 7/2012 | Wang et al. |
| 2012/0174196 | A1* | 7/2012 | Bhogavilli et al. ............... 726/5 |
| 2012/0284786 | A1* | 11/2012 | Somani et al. .................... 726/7 |

* cited by examiner

*Primary Examiner* — Tu Nguyen
(74) *Attorney, Agent, or Firm* — Edell, Shapiro & Finnan, LLC (57) ABSTRACT

Techniques are presented for seamless engagement and disengagement of Transport Layer Security proxy services. A first initial message of a handshaking procedure for a first secure communication session between a first device and a second device is intercepted at a proxy device. The first initial message of the handshaking procedure is saved at the proxy device. A second initial message of a second handshaking procedure for a second secure communication session between the proxy device and the second device is sent from the proxy device to the second device. It is determined from the second handshaking procedure that inspection of the first secure communication session is not to be performed by the proxy device. The first secure communication session is established without examination of the communication traffic by the proxy device.

23 Claims, 7 Drawing Sheets

SEAMLESS ENGAGEMENT AND DISENGAGEMENT OF TRANSPORT LAYER SECURITY PROXY SERVICES

TECHNICAL FIELD

The present disclosure relates to network environments utilizing Transport Layer Security Proxy Services.

BACKGROUND

Proxy devices equipped to provide Transport Layer Security (TLS) operate by intercepting network traffic flows between clients and servers. Specifically, a TLS proxy serves as a "man-in-the-middle," establishing a first secure connection between the client and the proxy, and a second secure connection between the proxy and the server. With these two secure connections in place, the TLS proxy receives encrypted communications from the client over the first secure connection, and decrypts the communication for examination at the proxy. If it is determined that the traffic should be forwarded to the server, the proxy re-encrypts the traffic according to the second secure connection, and sends the traffic to the server over the second secure connection. The inverse process is also performed where encrypted traffic is received from the server over the second secure connection, decrypted at the proxy, and re-encrypted and sent to the client over the first secure connection.

Due to certain rules, such as privacy laws, decryption of some traffic, such as online banking transactions, might not be permitted. In these situations the proxy needs to either enter the transaction after it is determined from a direct client-server connection that TLS inspection is allowed, or a TLS connection is initially established which is subsequently broken if it determined that TLS inspection is not allowed. In either instance, old connections at both the client and server are broken, and new connections are established, a process that is costly at the client, server and proxy. Moreover, breaking established connections may cause operational problems for some clients and servers that operate without awareness of the intervening proxy device.

DESCRIPTION OF EXAMPLE EMBODIMENTS

Overview

Techniques are presented herein for seamless engagement and disengagement of TLS proxy services. A first initial message of a handshaking procedure for a first secure communication session between a first device and a second device is intercepted at a proxy device. The first initial message of the first handshaking procedure is saved at the proxy device. A second initial message of a second handshaking procedure for a second secure communication session between the proxy device and the second device is sent from the proxy device to the second device. It is determined from the second handshaking procedure that inspection of the first secure communication session is not to be performed by the proxy device. The first secure communication session is established without examination of the communication traffic by the proxy device.

Example Embodiments

Figure 1:
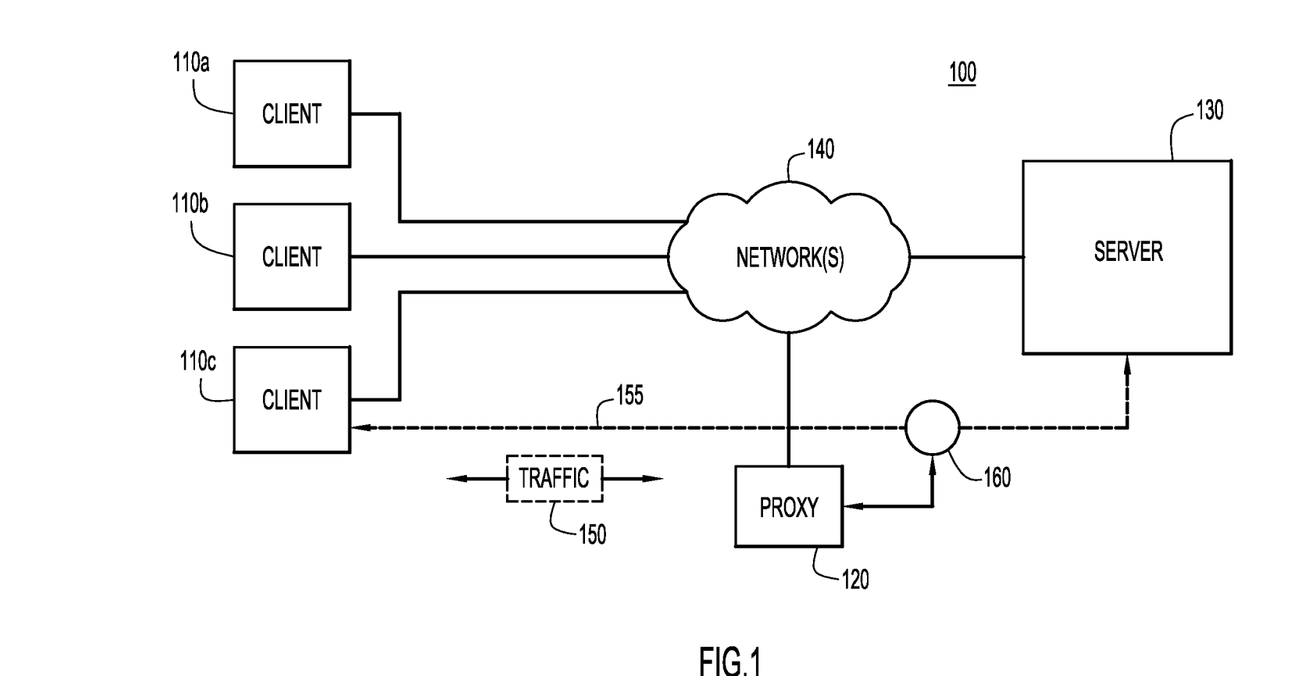
FIG. 1 illustrates an example computer network in which seamless engagement and disengagement of TLS proxy services are implemented.

Depicted in FIG. 1 is an example network environment 100 configured for seamless engagement and disengagement of TLS proxy services. Clients 110a-c are connected to proxy 120, and in turn, to server 130 through network 140. Proxy 120 is configured to seamlessly engage or disengage TLS proxy services without breaking a previously formed connection between any of the clients 110a-c and server 130 when traffic 150 is communicated between any of the clients 110a-c and server 130. The proxy 120 is configured to provide seamless TLS proxy engagement and disengagement of a session, e.g., session 155. Session 155 may be, for example, network traffic 150 communicated between client 110c and server 130 through the use of secure keys. Proxy 120 may engage and disengage from the establishment of session 155 as shown at 160, and as described in more detail hereinafter in connection with FIGS. 2-7.

Figure 2:
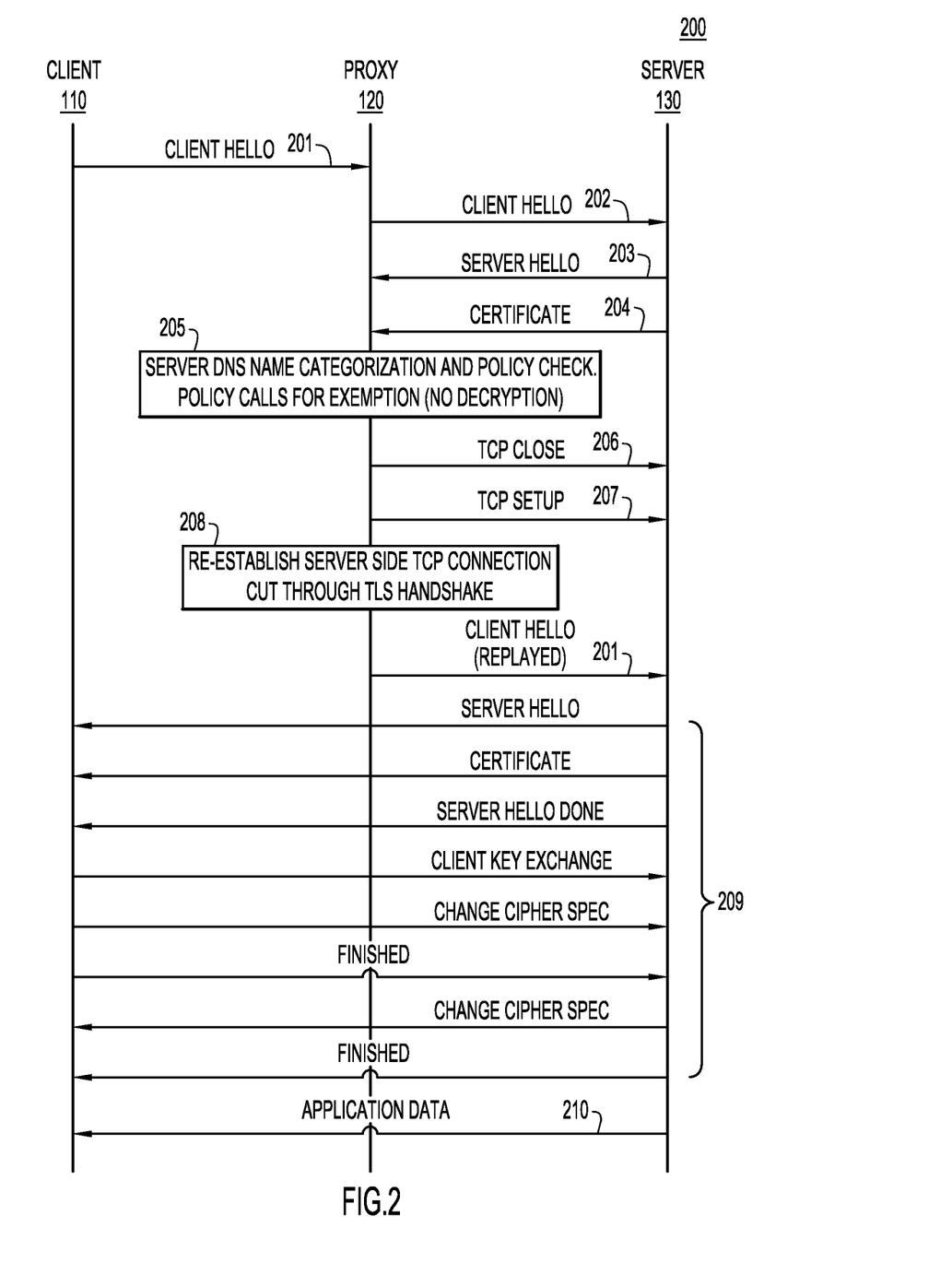
FIG. 2 illustrates an example ladder diagram for seamless disengagement of TLS proxy services.

With reference now being made to FIG. 2, a ladder diagram 200 is illustrated in which proxy 120 seamlessly disengages from a connection between client 110 and server 130. Message 201 comprises a client hello message sent from client 110 to server 130 in order to initiate a handshaking procedure. The client hello message 201 is intercepted by and stored at proxy 120. Client hello message 201 is not immediately forwarded to server 130, and server 130 is not yet aware that client 110 is attempting to initiate a secure connection with server 130.

With client hello (ClientHello) message 201 held at proxy 120, proxy 120 sends a new client hello message 202 to server 130. Client hello message 202 is based on client hello 201 in that it is configured to establish a similar handshaking procedure, but instead of establishing a connection between client 110 and server 130, the client hello message 202 is configured to establish a connection between proxy 120 and server 130.

Upon receiving client hello message 202, server 130 sends server hello message 203 to proxy 120. Server 130 also sends message 204 that includes a security certificate for server 130. Proxy 120 determines from the certificate contained in message 204 whether or not TLS proxy services should be applied to communications between client 110 and server 130. For example, if the Domain Name System (DNS) server name for server 130 indicated in the certificate is "Bank A," proxy 120 determines that the connection between client 110 and server 130 would fall into the online banking information category. Because privacy laws may prohibit the decryption of online banking information, proxy 120 determines that TLS proxy services are not to be invoked for a connection established between client 110 and server 130, as shown at 205. Accordingly, proxy 120 terminates the proxy-server handshaking procedure by sending a Transmission Control Protocol (TCP)

close message 206 and a TCP Setup message 207 which ultimately closes the connection between proxy 120 and server 130.

Upon making the determination that TLS proxy services should not be applied, the proxy reestablishes the client-server handshake as shown at 208. Specifically, client hello message 201, which has been stored at proxy 120 since it was initially received, is forwarded from proxy 120 to server 130. Client 110 and server 130 complete their handshaking procedure through messages 209 without inspection from proxy 120. Upon completion of the handshaking procedure, client 110 and server 130 begin sending application data 210 without TLS proxy services. Because message 201 was stored at proxy 120 without any indication to client 110 that proxy 120 was proceeding with its own handshaking, the handshaking procedure between client 110 and server 130 proceeds seamlessly without any interruption from the perspective of client 110. Neither client 110 nor server 130 receives any indication or notification that the proxy 120 intervened and examined the client hello message 201.

Figure 3:
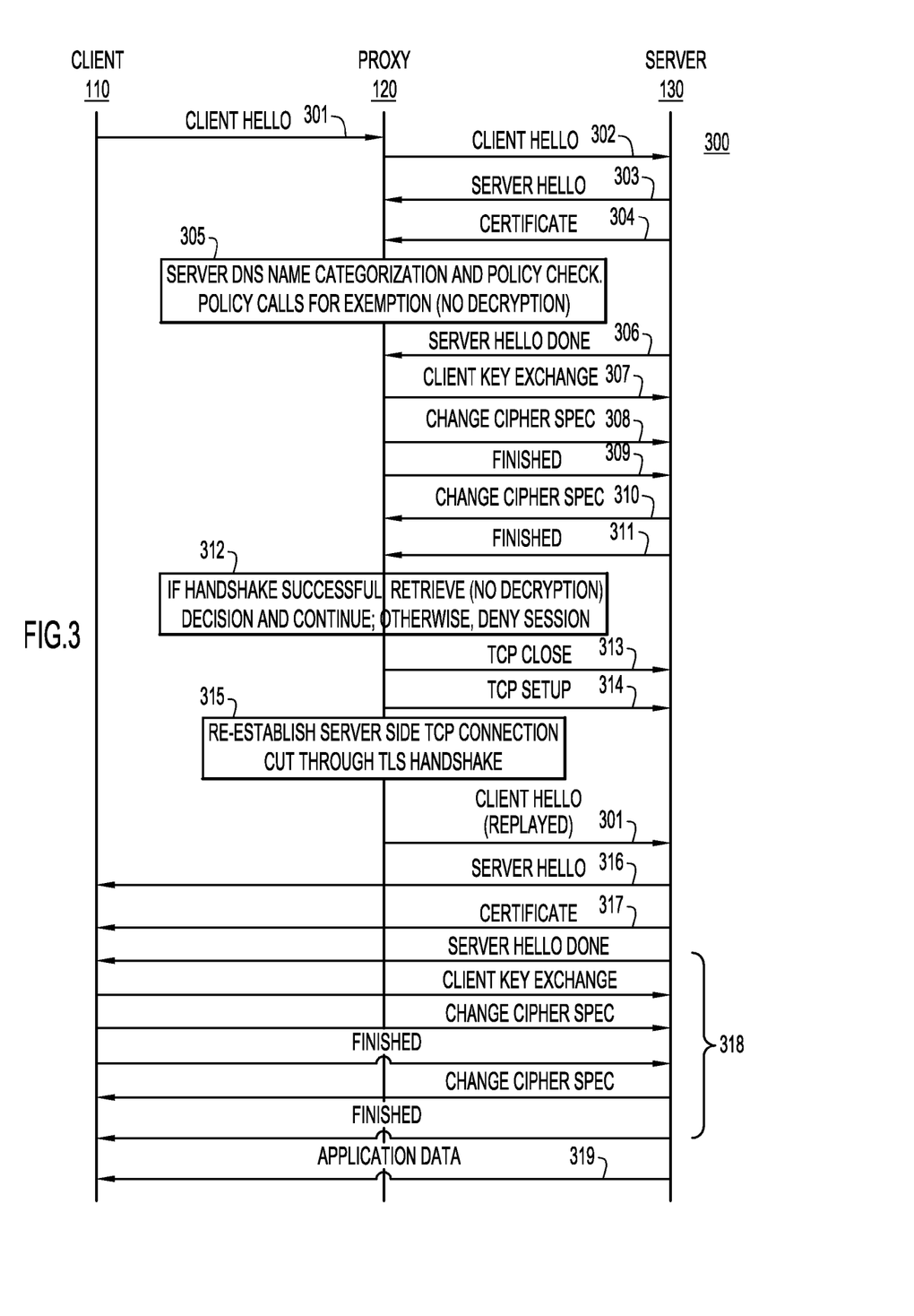
FIG. 3 illustrates another example ladder diagram for seamless disengagement of TLS proxy services.

Turning to FIG. 3, a ladder diagram 300 is shown which illustrates an exchange similar to that depicted in FIG. 2, but takes the proxy-server handshaking procedure to completion before reinitiating the client-server handshaking procedure. By fully completing the proxy-server handshaking procedure, additional security can be achieved, as will be explained in detail below.

The exchange of FIG. 3 begins with client hello message 301 which is intercepted and stored at proxy 120. Proxy 120 sends its own client hello message 302 to server 130, and receives server hello message 303 and a message 304 containing a certificate in response. Proxy 120 determines from the certificate contained in message 304 whether or not TLS proxy services should be applied to communications between client 110 and server 130, as shown at 305, but unlike the ladder diagram of FIG. 2, the proxy does not immediately terminate the handshaking procedure. Instead, proxy 120 proceeds with the proxy-server handshaking procedure all the way to its completion, performing the steps to ensure that server 130 is in possession of the necessary one or more private keys associated with the certificate.

Specifically, after receiving server hello done message 306, proxy 120 sends client key exchange message 307 and change cipher spec message 308, as well as finished message 309. In response, the server 130 sends change cipher spec message 310 and finished message 311. These messages allow proxy 120 to determine whether or not the server 130 is in possession of the appropriate private keys for the certificate presented in message 304. This provides additional security to the communication session. Without taking the proxy-server handshaking procedure to completion, if server 130 wanted to avoid TLS proxy services, it could present proxy 120 with a counterfeit certificate in message 304. For example, if the server 130 hosts games which are blocked by TLS proxy services, server 130 may attempt to circumvent the TLS proxy services by providing a counterfeit certificate in message 304. Specifically, server 130 could present a counterfeit "Bank A" certificate in message 304. If proxy 120 immediately removes itself from the process at this point, proxy 120 will no longer be intercepting messages between client 110 and server 130 after client hello 301 is forwarded to server 130, and the handshaking procedure is completed through messages 316-318.

On the other hand, if the proxy continues with its handshaking procedure through to the completion of the proxy-server handshaking procedure, when proxy 120 and server 130 verify their private keys through messages 307-311, proxy 120 will determine that server 130 does not hold the private key associated with the valid certificate presented to proxy 120 through message 304. Accordingly, the proxy 120 will be able to terminate the proxy-client handshaking procedure, and also send a message to client 110 terminating the client-server handshaking procedure.

Alternatively, if proxy 120 and server 130 are able to complete the proxy-server handshaking procedure through message 311, and proxy 120 determines that server 130 is in possession of the appropriate private keys, as shown at 312, proxy 120 may confidently allow the client-server handshaking procedure to proceed without inspection, as shown at 315.

Figure 4:
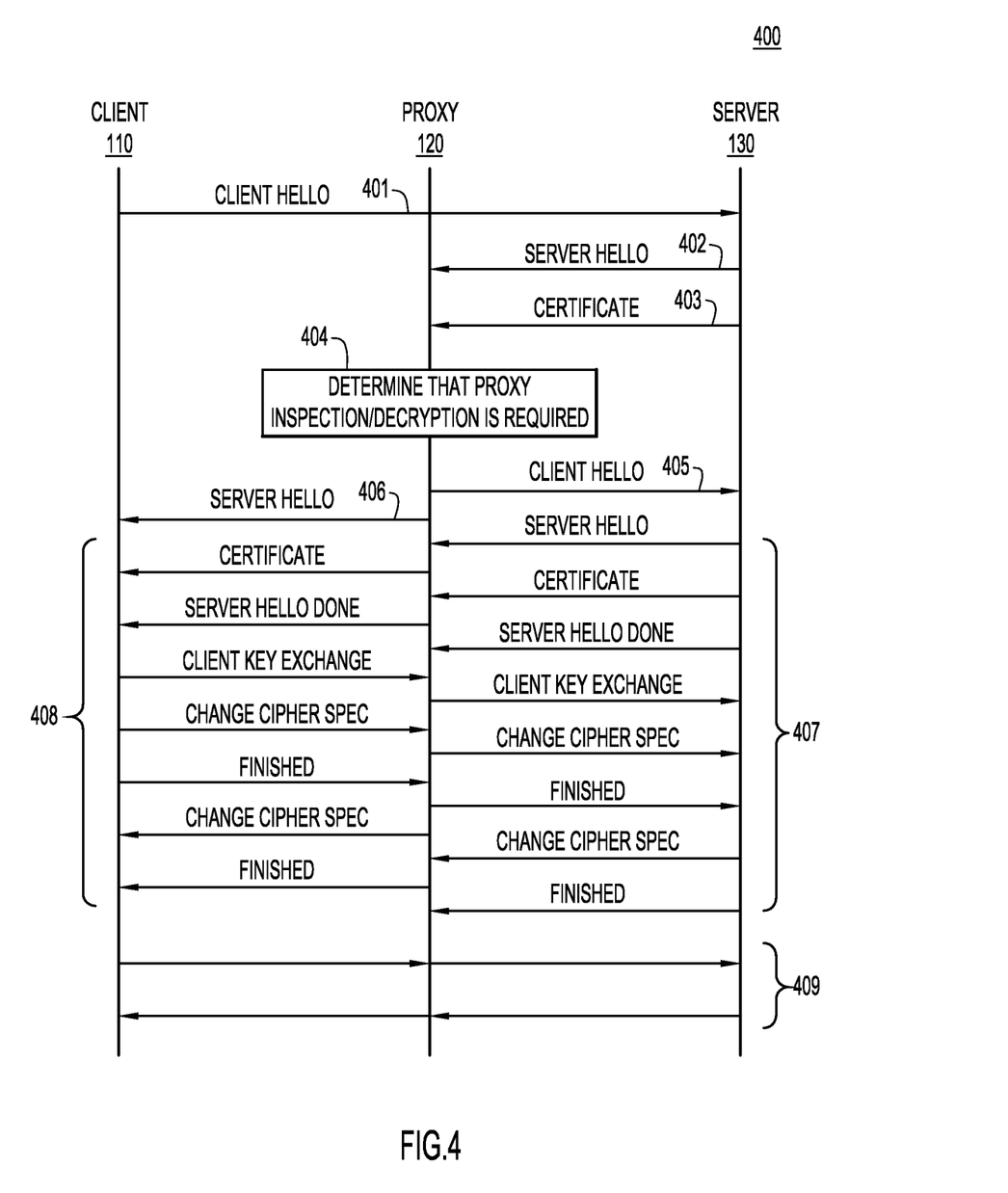
FIG. 4 illustrates an example ladder diagram for seamless engagement of TLS proxy services.

Turning now to FIG. 4, a ladder diagram 400 is provided that illustrates a procedure by which proxy 120 seamlessly engages in TLS proxy services. Client 110 sends client hello message 401 in order to establish a secure connection between client 110 and server 130. Instead of intercepting client hello message 401, proxy 120 allows client hello message 401 to pass through to server 130. Because client hello message 401 passes through to server 130 without any immediate intervention from proxy 120, if it is later determined that decryption of the data is not to be performed, client 110 and server 130 will be able to complete their handshaking procedure without ever receiving any indication of the presence of proxy 120. In other words, the actions of proxy 120 will be completely transparent to client 110 and server 130.

Upon receiving client hello message 401, server 130 responds with server hello message 402 and certificate message 403 to client 110. As the server hello message 402 and the certificate message 403 are passing through proxy 120 on their way to client 110, proxy 120 will examine the content of these messages. Based upon the content of the server hello message 402 and the certificate message 403, such as the DNS server name and/or category of server 130, proxy 120 determines whether or not TLS proxy services (proxy inspection/decryption) is to be applied to the communication session as shown at 404.

If proxy 120 determines that TLS proxy services are to be applied to the communication session between client 110 and server 130, proxy 120 sends out a new client hello message 405 from proxy 120 to server 130, and a new server hello message 406 from proxy 120 to client 110. Specifically, proxy 120 spoofs client hello message 401 to create client hello message 405, using all of the same parameters as client hello message 401 except that proxy 120 will take the place of client 110 in the handshaking procedure. Similarly, new server hello message 406 is spoofed from original server hello message 402, except that proxy 120 takes the place of server 130 in the handshaking procedure.

Upon receiving spoofed client hello message 405, server 130 will continue its handshaking procedure under the assumption that the parameters have changed since the time of receipt of original client hello message 401. Because server 130 interprets the receipt of new client hello message 405 as a change of parameters of the already pending client-server handshaking procedure, server 130 will complete the handshaking procedure with proxy 120 through messages shown at reference numeral 407 without breaking the current connection.

Upon receiving spoofed server hello message 406, client 110 will continue its handshaking procedure under the assumption that the server hello message 406 is the first and only response to client hello message 401. Accordingly, client 110 will complete the handshaking procedure with proxy 120 through the messages shown at reference numeral 408 without breaking the current connection, and with the previous intervention of proxy 120 having been completely transparent to client 110. With the handshaking procedures completed, application data is sent via messages 409. Accordingly, messages sent from the client 110 to the server 130 are intercepted at the proxy 120, decrypted for inspection, and then re-encrypted for transmission to the server. Similarly, messages sent from the server 130 to the client 110 are intercepted by the proxy 120, decrypted for inspection, and then re-encrypted for transmission to the client 110.

Alternatively, if proxy 120 determines that TLS proxy services are not to be applied, original server hello message 402 and original certificate message 403 will be received by client 110, and the handshaking procedure between client 110 and server 130 will complete without intervention from proxy 120.

Figure 5:
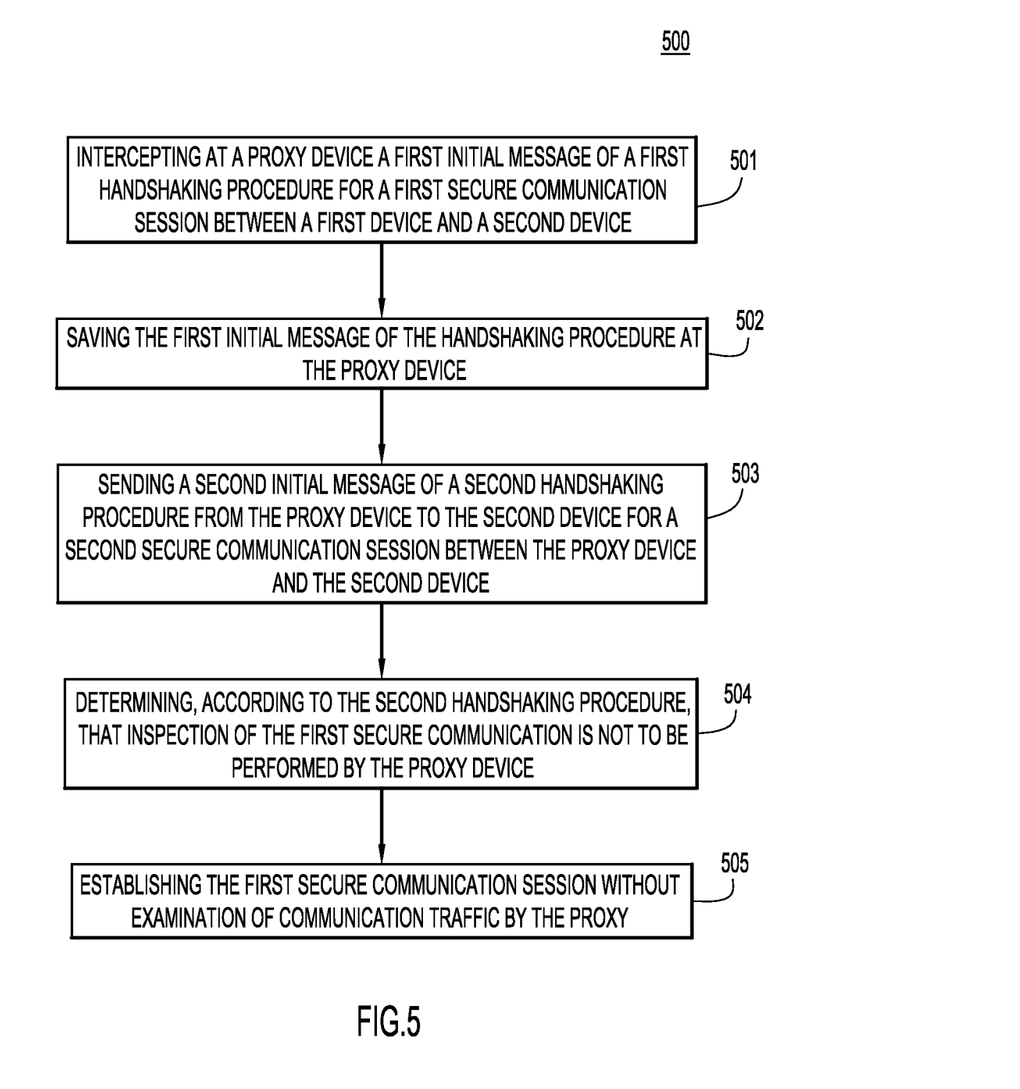
FIG. 5 is a flowchart that illustrates an example procedure for seamless disengagement of TLS proxy services.

With reference now to FIG. 5, a flowchart for a process 500 is illustrated for seamlessly disengaging from a handshaking procedure. In step 501, an initial message of a handshaking procedure is intercepted at a proxy device. The purpose of the handshaking procedure is to establish a first secure communication session between a first device, such as a client, and a second device, such as a server. The initial message of the handshaking procedure may take the form of a client hello message according to a TLS handshake.

In step 502, the first initial message of the handshaking procedure is saved at the proxy device.

In step 503, in place of the first initial message, the proxy device forwards a second initial message of a second handshaking procedure to the second device to establish a second secure communication between the proxy device and the second device.

In step 504, it is determined from the second handshaking procedure that inspection of the first secure communication is not to be performed by the proxy device. This determination may be made by examining a server hello message and certificate sent from the second device to the proxy during the second handshaking procedure.

Finally, in step 505, the first secure communication session is established without examination of the communication traffic by the proxy. The first communication session may be established by terminating the second handshaking procedure and forwarding the saved first initial message once it is determined that inspection of the first secure communication session is not to be carried out. Alternatively, the proxy device may wait until after the second handshaking procedure completes before establishing the first secure communication session.

Figure 6:
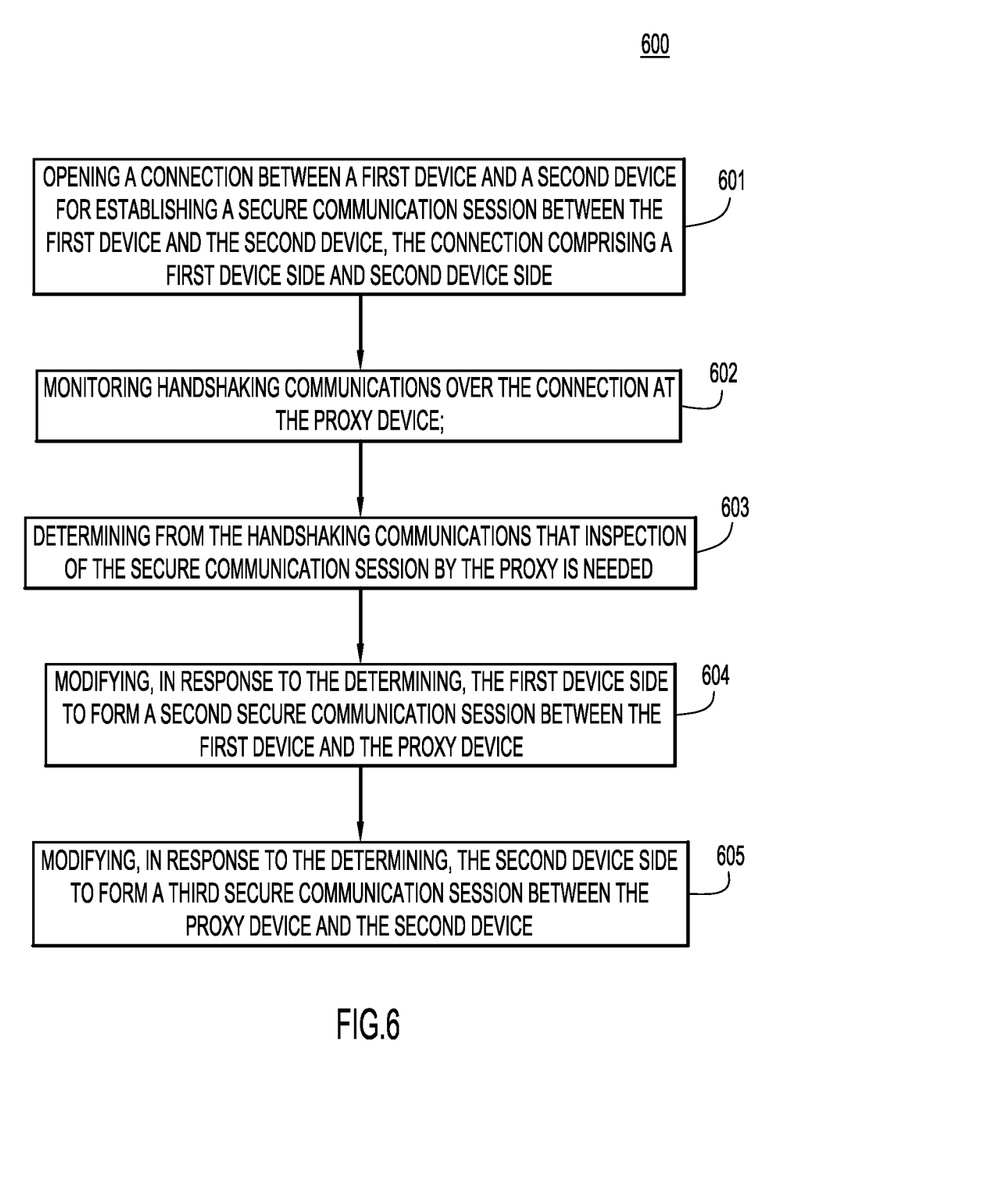
FIG. 6 is a flowchart that illustrates an example procedure for seamless engagement of TLS proxy services.

With reference to FIG. 6, a flowchart is illustrated of a procedure 600 for seamlessly engaging in a handshaking procedure between two devices. At step 601, a connection is opened between a first device and a second device for establishing a secure communication session between the first device and the second device. The connection comprises a first device side and a second device. For example, the first device side may comprise a client port, while the second device side comprises a server port.

In step 602, handshaking communications are monitored over the connection at the proxy device. For example, if the connection comprises a TLS handshaking procedure, the proxy may monitor the client hello message, the server hello message, the certificate, the server hello done message, the client key exchange, the change cipher spec message, and other messages.

In step 603, it is determined from the handshaking communications that inspection of the secure communication session by the proxy is needed. For example, depending on the contents of the certificate, such as the DNS server name or category, it may be determined that inspection of the secure traffic to be sent across the secure communication session would be appropriate or necessary.

In step 604, in response to the determination made at step 603, the first device side of the connection may be modified to form a second secure communication session between the first device and the proxy device. For example, the proxy device may send a new server hello message to the first device in order to establish a proxy-client secure connection. From the perspective of the first device, the second secure connection may appear to be the completion of the first secure communication session that the first device attempted to establish in step 601. For example, the first device may view the new server hello message sent from the proxy device as the first and only response to a client hello message sent by the first device. In other words, the proxy device will reuse the first device side of the first secure communication session to form a first device-proxy communication session.

Finally, in step 605, in response to the determination made at step 603, the second device side is modified to form a third secure communication session between the proxy and the second device. For example, a new client hello message may be sent from the proxy to the second device in order to establish a proxy-server secure connection. Accordingly, the second device may view the third secure communication session as the establishment of first secure communication session, but established with slightly modified parameters. For example, if the proxy device sends a new client hello message to the second device in order to modify the second device side, the second device will view this as a modification of the first secure communication session, and not a new session. In other words, the proxy device will reuse the second device side of the first secure communication session to form a proxy-second device communication session.

Accordingly, when traffic is sent from the first device to the second device via the second secure communication session, the traffic will be intercepted and decrypted at the proxy device. After inspection at the proxy device, the traffic will be re-encrypted and sent to the second device via the third secure communication session. Similarly, when traffic is sent from the second device to the first device via the third secure communication session, the traffic will be intercepted and decrypted at the proxy device. After inspection at the proxy device, the traffic will be re-encrypted and sent to the first device via the second secure communication session.

Figure 7:
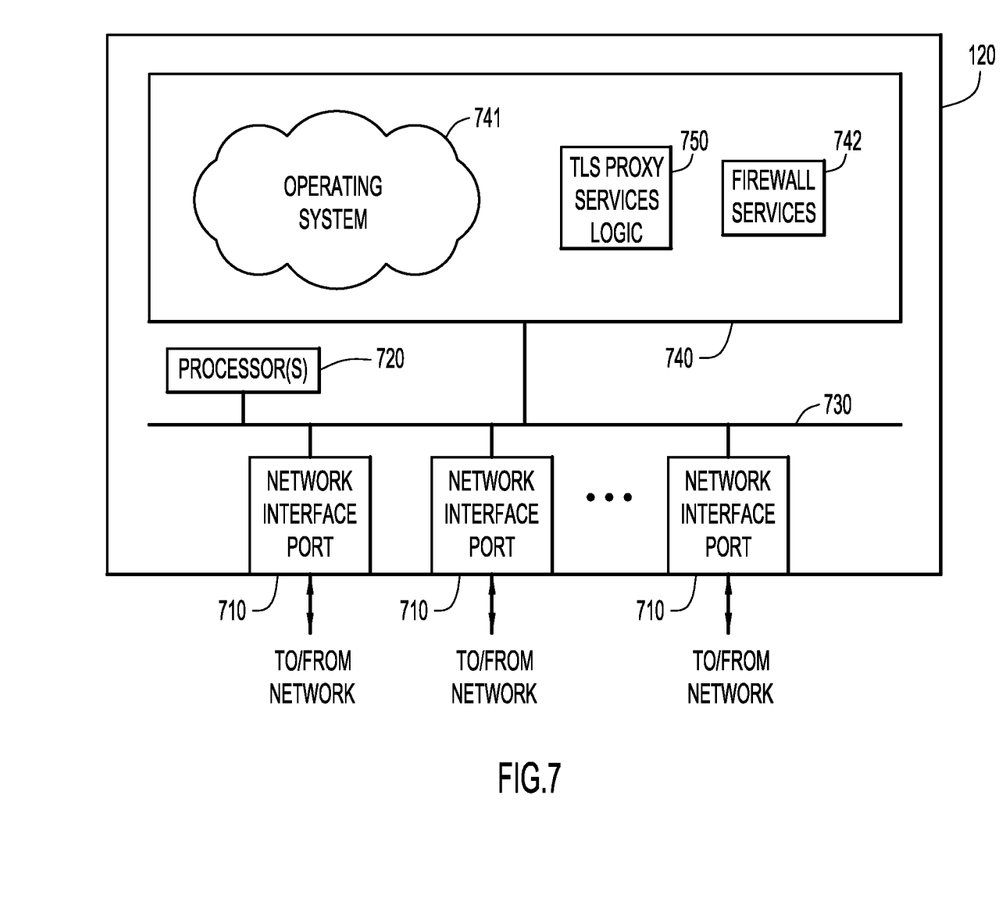
FIG. 7 is an example block diagram of a network device configured to perform seamless engagement and disengagement of TLS proxy services.

With reference to FIG. 7, an example block diagram is shown of a network device, e.g., a proxy device 120, configured to perform the techniques described herein in connection with FIGS. 1-6. The proxy device 120 comprises network interface ports 710, processor(s) 720, bus 730, and memory 740. For simplicity, the network interface ports 710 may be referred to collectively as a network interface unit. The memory 740 comprises software instructions for operating system 741 and firewall services 742 and TLS proxy services logic 750. The TLS proxy services logic 750 may be includes as part of the software for the firewall services 742.

Memory 740 may comprise read only memory (ROM), random access memory (RAM), magnetic disk storage media devices, optical storage media devices, flash memory devices, electrical, optical, or other physical/tangible (e.g., non-transitory) memory storage devices. The processor 720 is, for example, a microprocessor or microcontroller that executes instructions for the proxy device logic. Thus, in general, the memory 740 may comprise one or more tangible (non-transitory) computer readable storage media (e.g., a memory device) encoded with software comprising computer executable instructions and when the software is executed (by the processor 720), and in particular firewall services software 742 and TLS proxy services logic 750, it is operable to perform the operations described herein in connection with FIGS. 1-6.

In summary, techniques are presented herein for seamless engagement and disengagement of TLS proxy services. Specifically, these techniques allow a proxy device to gracefully exit from a handshaking procedure, and allow the client and server to directly establish a secure connection. The connection re-establishment is completely isolated on the server side, and does not rely on the client implementing TCP connection reestablishment procedures. These techniques further provide for selective engagement of TLS proxy services without requiring the proxy to insert itself into the initial handshaking procedure. If decryption is deemed unnecessary, the original entities can seamlessly continue the connection with no firewall involvement.

The methods and systems described herein may provide significant performance advantages because TLS proxy services need not be engaged for all communication sessions, especially communication sessions that do not require decryption. In addition to lower computational complexity, the methods and systems provided herein do not require any additional connections to be established by the proxy and/or the server. Furthermore, according to some implementations of the techniques described herein, the original connection is fully preserved down to transport port values. Additionally, the methods and techniques herein may prevent errors that can occur when a proxy closes a connection between a client and a server. For example, the client or server may erroneously interpret the closing of the connection as an indication that the device at the other end of the connection is no longer available. Because the methods and systems herein provide seamless engagement and disengagement, no connection is closed, and therefore, there can be no misinterpretation of the reason for a closed connection.

The above description is intended by way of example only.

What is claimed is:

1. A method of establishing a connection across a network, comprising:
   intercepting at a proxy device a first initial message of a first handshaking procedure for a first secure communication session between a first device and a second device;
   saving the initial message of the first handshaking procedure at the proxy device;
   sending a second initial message of a second handshaking procedure from the proxy device to the second device for a second secure communication session between the proxy device and the second device;
   determining, according to the second handshaking procedure, that inspection of the first secure communication session is not to be performed by the proxy device;
   forwarding the first initial message of the first handshaking procedure to the second device in response to determining that inspection of the first secure communication session is not to be performed by proxy device; and
   establishing the first secure communication session without examination of communication traffic by the proxy device.

2. The method of claim 1, wherein establishing the first communication session comprises:
   completing the first hand shaking procedure between the first device and second device without inspection of messages by the proxy device.

3. The method of claim 1, wherein determining that inspection of the first secure communication session is not to be performed by the proxy device comprises:
   examining a certificate contained in a message from the second device.

4. The method of claim 3, wherein determining that inspection of the first secure communication session is not to be performed by the proxy device further comprises:
   allowing the second handshaking procedure to complete to ensure the second device is in possession of one or more keys associated with the certificate.

5. The method of claim 1, further comprising:
   closing the second secure communication session prior to establishing the first secure communication session.

6. A method of establishing a connection across a network, comprising:
   opening a connection between a first device and a second device for initiating a first secure communication session, the connection comprising a first device side and a second device side;
   monitoring handshaking communications over the connection at a proxy device, wherein the monitoring comprises monitoring a first initial message of the handshaking procedure sent from the first device to the second device and monitoring a second initial message of the handshaking procedure sent from the second device to the first device;
   determining from the handshaking communications that inspection of the first secure communication session by the proxy device is to be performed;
   modifying the first device side to form a second secure communication session between the first device and the proxy device by sending a third initial message over the connection from the proxy device to the first device; and
   modifying the second device side to form a third secure communication session between the proxy device and the second device by sending a fourth initial message from the proxy device to the second device.

7. The method of claim 6, wherein modifying the first device side comprises sending a server hello message to the first device from the proxy device; and
   modifying the second device side comprises sending a client hello message to the second device from the proxy device.

8. The method of claim 7, wherein modifying the first device side further comprises completing a handshaking procedure between the first device and the proxy device; and
   modifying the second device side comprises completing a handshaking procedure between the proxy device and the second device.

9. The method of claim 6, further comprising:
   receiving traffic from the first device via the second secure communication session;
   decrypting and inspecting the traffic at the proxy device; and
   sending the traffic to the second device through the third secure communication session.

10. The method of claim 6, further comprising:
    receiving traffic from the second device via the third secure communication session;
    decrypting and inspecting the traffic at the proxy device; and
    sending the traffic to the first device through the second secure communication session.

11. The method of claim 6, wherein determining from the handshaking communications that inspection of the first secure communication session by the proxy device is to be performed comprises examining a certificate sent from the second device to the first device.

12. An apparatus comprising:
a network interface unit configured to enable communications over a network;
a memory; and
a processor coupled to the memory and the network interface unit, and configured to:
intercept a first initial message of a first handshaking procedure for a first secure communication session between a first device and a second device;
save the initial message of the first handshaking procedure;
send a second initial message of a second handshaking procedure to the second device for a second secure communication session with the second device;
determine, according to the second handshaking procedure, that inspection of the first secure communication session is not to be performed;
forward the first initial message of the first handshaking procedure to the second device in response to determining that inspection of the first secure communication session is not to be performed by proxy device; and
close the second secure communication session.

13. The apparatus of claim 12, wherein the processor is further configured complete the first hand shaking procedure between the first device and second device without inspecting the handshaking messages.

14. The apparatus of claim 12, wherein the processor is further configured to:
receive a certificate from the second device; and
examine the certificate to determine that inspection of the first secure communication session is not to be performed.

15. An apparatus comprising:
a network interface unit configured to enable communications over a network;
a memory; and
a processor coupled to the memory and the network interface unit, and configured to:
monitor handshaking communications over a connection between a first device and a second device for initiating a first secure communication session by monitoring a first initial message of the handshaking procedure sent from the first device to the second device and monitoring a second initial message of the handshaking procedure sent from the second device to the first device;
determine from the handshaking communications that inspection of the first secure communication session is to be performed;
modify a first device side of the connection to form a second secure communication session with the first device by sending a third initial message over the connection from the proxy device to the first device; and
modify a second device side of the connection to form a third secure communication session with the second device by sending a fourth initial message from the proxy device to the second device.

16. The apparatus of claim 15, wherein the processor is further configured to:
send the third initial message by sending a server hello message to the first device to modify the first device side of the connection; and
send the fourth initial message by sending a client hello message to the second device to modify the second device side of the connection.

17. The apparatus of claim 15, wherein the processor is further configured to examine a certificate sent from the second device to determine from the handshaking communications that inspection of the first secure communication session is to be performed.

18. A non-transitory computer readable tangible storage media encoded with instructions that, when executed by a processor, cause the processor to:
intercept a first initial message of a first handshaking procedure for a first secure communication session between a first device and a second device;
save the initial message of the first handshaking procedure;
send a second initial message of a second handshaking procedure to the second device for a second secure communication session with the second device;
determine that inspection of the first secure communication is not to be performed;
forward the first initial message of the first handshaking procedure to the second device in response to determining that inspection of the first secure communication session is not to be performed by proxy device; and
close the second secure communication session.

19. The computer readable tangible storage media of claim 18, wherein the instructions further cause the processor to complete the first hand shaking procedure between the first device and second device without inspecting the handshaking messages.

20. The computer readable tangible storage media of claim 18, wherein the instructions further cause the processor to:
receive a certificate from the second device; and
examine the certificate to determine that inspection of the first secure communication session is not to be performed.

21. A non-transitory computer readable tangible storage media encoded with instructions that, when executed by a processor, cause the processor to:
monitor handshaking communications over a connection between a first device and a second device for initiating a first secure communication session by monitoring a first initial message of the handshaking procedure sent from the first device to the second device and monitoring a second initial message of the handshaking procedure sent from the second device to the first device;
determine from the handshaking communications that inspection of the first secure communication session is to be performed;
modify a first device side of the connection to form a second secure communication session with the first device by sending a third initial message over the connection from the proxy device to the first device;
modify a second device side of the connection to form a third secure communication session with the second device by sending a fourth initial message from the proxy device to the second device.

22. The computer readable tangible storage media of claim 21, wherein the instructions further cause the processor to:
send the third initial message by sending a server hello message to the first device to modify the first device side of the connection; and
send the fourth initial message by sending a client hello message to the second device to modify the second device side of the connection.

23. The computer readable tangible storage media of claim 21, wherein the instructions further cause the processor to examine a certificate sent from the second device to determine from the handshaking communications that inspection of the first secure communication session is to be performed.

* * * * *